[19] United States Patent
Cook

[11] Patent Number: 4,708,316
[45] Date of Patent: Nov. 24, 1987

[54] VARIABLE RATE EGR VALVE WITH STEP MOTOR CONTROL AND METHOD THEREFOR

[75] Inventor: John E. Cook, Chatham, Canada
[73] Assignee: Canadian Fram Limited, Chatham, Canada
[21] Appl. No.: 679,198
[22] Filed: Dec. 7, 1984
[51] Int. Cl.⁴ .................... F16K 31/126; F02M 25/06
[52] U.S. Cl. ........................................ 251/39; 251/42; 251/60; 137/907; 123/571
[58] Field of Search ................. 251/42, 39, 60, 30.03; 137/907; 123/571

[56] References Cited

U.S. PATENT DOCUMENTS

| 2,554,158 | 5/1951 | Spence | 251/39 |
| 3,023,996 | 3/1962 | Robertson | 251/38 X |
| 3,712,578 | 1/1973 | Dawson | 251/35 |
| 3,762,384 | 10/1973 | Day et al. | 137/907 X |
| 3,990,418 | 11/1976 | Nohira et al. | 251/60 X |
| 4,284,261 | 8/1981 | Benjamin et al. | 251/60 |
| 4,355,606 | 10/1982 | Casey | 251/30.03 |
| 4,412,517 | 11/1983 | Kobashi et al. | 123/339 |
| 4,414,942 | 11/1983 | Itoh et al. | 123/339 |
| 4,422,497 | 12/1983 | Komoda et al. | 165/23 |

OTHER PUBLICATIONS

Step Motor Drive Circuitry and Open Loop Control (Author—J. Maginot and W. Oliver).

Primary Examiner—Arnold Rosenthal
Attorney, Agent, or Firm—Markell Seitzman; Russel C. Wells

[57] ABSTRACT

A variable flow rate valve (10) comprising; a housing (12) defining a vacuum chamber (35) and a flexible diaphragm (50) secured to said housing (12). The diaphragm defines one extreme of the pressure chamber (35) and is movable in one direction in response to decreases in the pressure within the pressure chamber and movable in an opposite direction in response to increases in the pressure within the pressure chamber. The valve (10) further includes means (40, 100, 110, 112) for providing a mechanical position limit or stop for the diaphragm in the one direction and means (126, 84, 86, 92, 94) for selectively varying the pressure within the pressure chamber for causing the diaphragm to move in response to the pressure differential thereacross.

4 Claims, 4 Drawing Figures

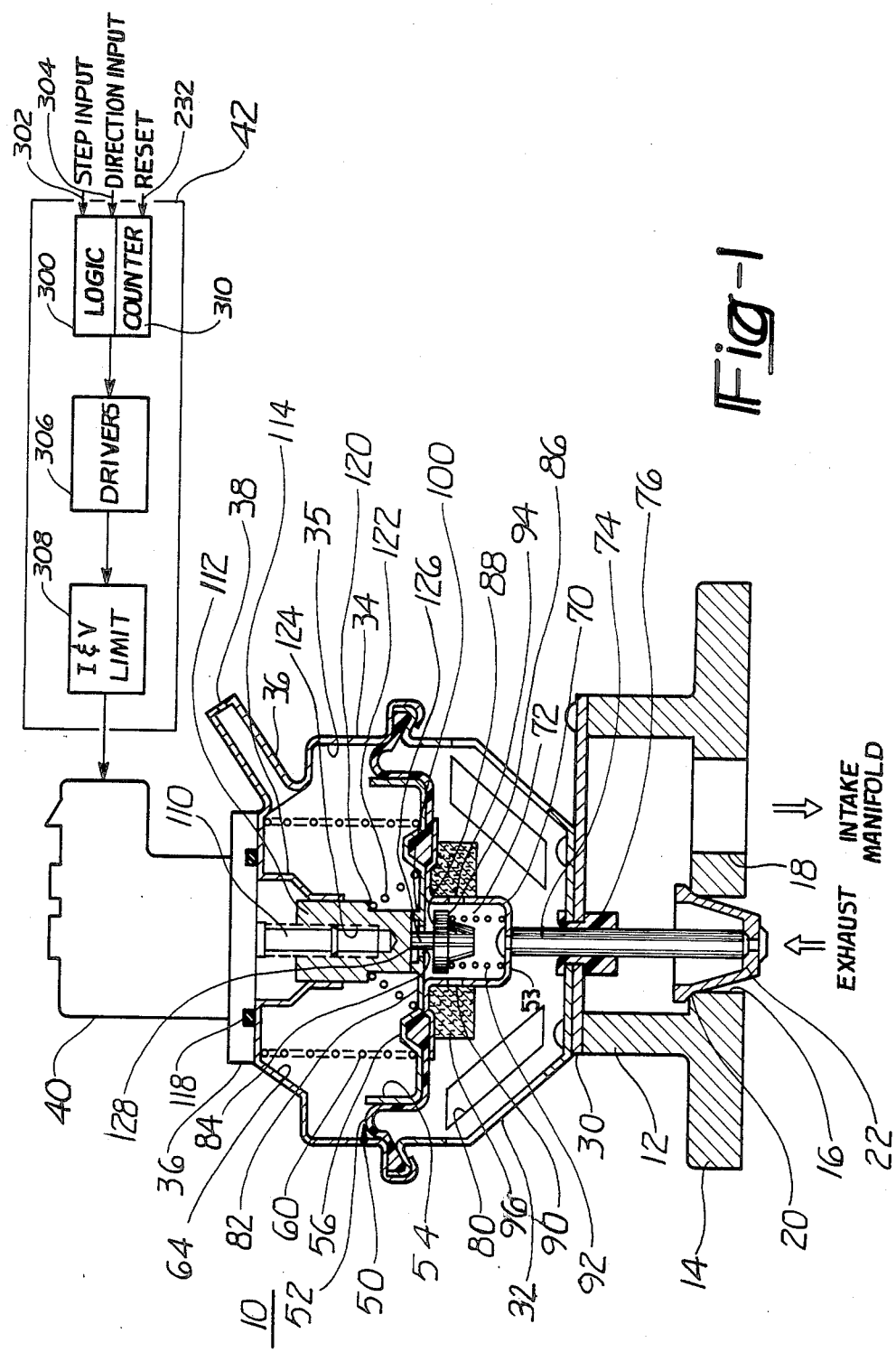

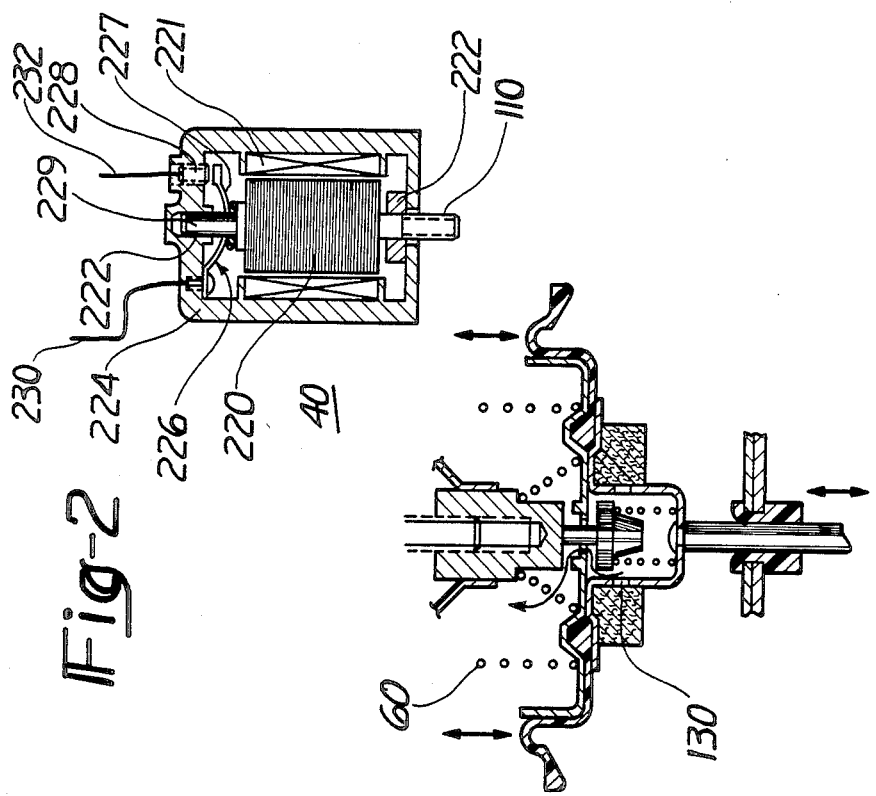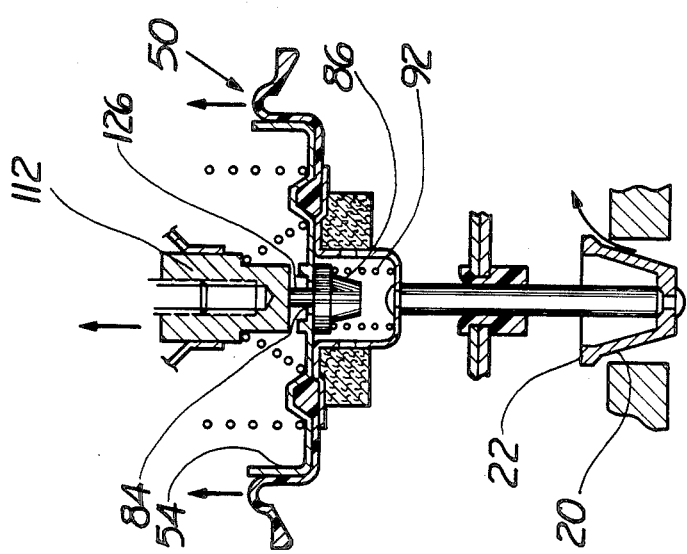

VARIABLE RATE EGR VALVE WITH STEP MOTOR CONTROL AND METHOD THEREFOR

BACKGROUND AND SUMMARY OF THE INVENTION

The present invention relates generally to pneumatic valves and more particularly to an EGR valve capable of controlling flow rate under the cooperative control of a vacuum source and an electrically responsive device such as a step motor.

Exhaust gas recirculation (EGR valves) have long found application within a pollution control system of an automotive engine wherein a variable percent of the exhaust gases are recirculated into the intake manifold of the engine. Historically such EGR valves were originally totally vacuum responsive wherein a pressure differential was generated across a flexiable diaphragm. Movement of the flexiable diaphragm is used to vary the position of a pintle valve relative to a valve seat to control the percent of exhaust gases permitted to recirculate into the intake manifold. The performance of such vacuum responsive valves is potentially flawed due to its relatively sluggish response, valve spring relation, aging of the diaphragm material and its dependence upon vacuum pressure which is generally derived from the pressure of the intake manifold. Such vacuum pressure can be shown to reduce substantially during wide open throttle operating conditions. To obtain precise vacuum control these vacuum responsive valves preferably operate in conjunction with a vacuum regulating device which controls the magnitude of vacuum pressure communicated thereto. The totally pneumatic EGR valve may be functionally replaced by a valve which employs a plurality of electrically responsive solenoids as shown in my patent application Ser. No. 659,501 filed 10/10/84 entitled "Electro-Mechanically Controlled EGR Valve and Method." Such system is characterized by a rapid and repeatable mode of operation under all vehicle operating conditions. However, exhaust gas flow rate is varied discretely in steps rather than continuously. U.S. Pat. No. 4,412,517 by Kaboshi et al illustrates an idle speed control valve which is used to bypass a percentage of the input air about the intake manifold to control the idle speed of an engine and employs a step motor to control the amount of air flowing into the air bypass passage. A flow control valve is connected directly to a lead screw whose motion moves the flow control valve. The direct connection of the flow control valve to the step motor results in a system which is characterized by a sluggish response and further requires a relatively massive step motor because of the direct connection to the flow control valve. Characteristic disadvantages of step motors are: step overshoot, limited ability to handle high inertia loads, increased positional error due to frictional loads and the inability to follow every pulse command. These disadvantages contribute to significant position errors when the step motor is used in an open loop manner.

It is therefore an object of the present invention to provide a fast, repeatable and accurately positioned EGR valve which is void of the difficiencies in the prior art. A further object of the present invention is to control EGR flow rate under the combined cooperation of a vacuum source and an electrically responsive mechanism such as a step motor. An advantage of the present invention derived from the dual control aspects recited above is the ability to use of an inexpensive, low inertia, rapidly, responding step motor. In addition, as described in greater detail below the invention includes means for periodically resetting the counters or computer or storage registers associated with the step motor to compensate for any of the control signals for which the step motor did not respond.

Accordingly the invention comprises:

A variable flow rate valve comprising; a housing defining a vacuum chamber. A flexible diaphragm is secured to the housing and defines one extreme of the pressure chamber. The diaphragm is movable in one direction in response to decreases in the pressure within the pressure chamber and movable in an opposite direction in response to increases in the pressure within the pressure chamber. The valve further includes means independent of the diaphragm for providing a mechanical position limit or stop for the diaphragm in one direction and means for selectively varying the pressure within the pressure chamber for causing the diaphragm to move in response to the pressure differential thereacross. The valve may further include means for resetting the control electronics associated with the step motor.

BRIEF DESCRIPTION OF THE DRAWINGS

In the drawings:

FIG. 1 illustrates a cross-sectional view of a step motor control EGR valve.

FIG. 2 illustrates a partial cross-sectional view of the step motor of FIG. 1 in greater detail.

FIG. 3 illustrates the invention in one of its operating conditions.

FIG. 4 illustrates the invention in another operating condition.

DETAILED DESCRIPTION OF THE DRAWINGS

With reference to the drawings there is illustrated a step motor controlled EGR valve generally designated as 10. The EGR valve 10 includes a housing 12 comprising a lower mounting bracket 14 adapted to receive exhaust gases through a passage 16 and to communicate the exhaust gases to the intake manifold of an engine through passage 18 in a known manner. The passage 16 is fitted with a valve seat 20 which cooperates with a pintle valve 22 to vary the flow area through passage 16 and hence the percentage of exhaust gas permitted to flow from passage 16 into the intake manifold via passage 18. The housing 12 further includes a plate 30 attached to bracket 14. The plate 30 supports additional housing members such as a lower housing member 32 and an upper housing member 34. The upper housing member 34 defines a pressure or vacuum chamber 35 and contains a vacuum port 36 having a control orifice 38 lodged therein. In order to eliminate any vacuum loss at idle when EGR flow is not required it would be beneficial to use a ported vacuum signal from a carburetor or throttle body. Seated upon the upper housing member 34 is a bracket 36 which supports a step motor 40. The step motor is responsive to a series of pulsed signals which are input thereto from the step motor control unit 42 in a known manner. A flexible diaphragm generally designated as 50 is secured between the upper and lower housing members 32 and 34 respectively. More particularly the diaphragm 50 comprises a flexible disk 52 preferably manufactured of rubber or the like. The diaphragm 50 also functions as a hermetic seal between the housing members 32 and 34. The diaphragm 50 further includes a valve housing 53 secured to the lower surface of the flexible disk 52 and a piston or plate 54 secured to the upper surface of the disk 52. The piston 54 comprises an annular offset 56 extending above the disk 52. The outermost portion of the annular offset 56 is adapted to receive a diaphragm spring 60 which biases the diaphragm 50 in a downward direction as viewed in FIG. 1. The diaphragm spring 60 is positioned within the housing 12 by the shoulder 64 fabricated integrally within the upper housing member 34.

The valve housing 53 comprises a downwardly directed hollow member 70 defining a valve cavity 72 therein. Attached to the bottom of the member 70 is a shaft 74 which extends through plate 30 and to which is connected the pintle valve 22. A seal 76 positioned within plate 30 slidably receives the shaft 74 and prevents exhaust gases from entering the atmosphere through the open lower housing member 32. The lower housing member 32 comprises a plurality of openings 80 which permits atmospheric air to react against the underside of the diaphragm 50 and further operates to minimize heat transfer to the diaphragm 50 and parts housed therein.

The piston or plate 54 further comprises a substantially flat surface 82 defining a centrally located opening 84. The flat surface 82 substantially encloses the valve cavity 72 but for the opening 84. Positioned within the valve cavity 72 is a valve 86 having a flat sealing surface 88. The valve 86 may be provided with a shoulder 90 to receive a valve spring 92 which urges the valve 86 to seal the opening 84. The member 70, which supports the valve spring 92 and valve 86, further includes a plurality of openings 94 to permit air at atmospheric pressure to flow into the cavity 74 and into the upper housing member 34 if the valve 86 is moved off from the opening 84. The boss 70 further supports a ring filter material 96 which prevents contamination of the structure within the member 70 and upper housing member 34.

The plate or piston 54 may further include, proximate the opening 84, a plurality of upraised lands or projections 100. The purpose of these projections are to prohibit the complete closure of the opening 84 from above.

The step motor 40 comprises a lead screw 110 which extends into the upper housing member 34. The lead screw 110 is rotatable with a rotor 220 shown in FIG. 3. Threadably positioned about the lead screw 110 is a nut 112. The nut 112 is preferably non-circular in shape and secured from rotation by a circumferentially extending flange 114 which is preferably formed as an integral extention of the upper housing member 34. The lead screw 110 and step motor 40 are positioned relative to the upper housing member 34 by the bracket 36 which is secured to the upper housing member 34 by means of bolts, rivots, etc. in a known manner. An O-ring 118 is fitted within the bracket 36 to provide a seal between the bracket 36 and the upper housing member 34. The nut 112 is fabricated with a shoulder 120 which is adapted to receive a nut spring 122. The spring 122 is preferably conically shaped or tapered and biases the nut 112 and the diaphragm 50 thereapart. The nut 112 is threadably received onto the lead screw through a threaded cavity 124. The nut further includes a projection 126 which extends from a lower seating surface 128 which is adapted to engage the lands 100.

It can be seen in FIG. 1 that the seating surface 128 of the nut 112 cannot totally prohibit communication through the opening 84 by virtue of the upraised lands or projections 100 carried by the plate 54. It should be appreciated that the lands 100 may be replaced by a plurality of projects extending from the seating surface 128 of the nut 112.

As illustrated in FIG. 2 the lead screw 110 is rotatable with the rotor 220 of the step motor 40 relative to the motor windings or stator 221. The rotor 220 in turn is rotationally supported by bearings 222 such as a thrust bearing which is supported within a housing 224. The bearings 222 may be replaced by a bushing of a known type. The bearings or bushings 222 further permit the rotor 220 to move axially in response to axial forces imparted to the lead screw 110. Fixed to the housing 224 is an electrical switch 226 having an arm 227 which is positioned about an end shaft 229 of the rotor 220 and which is moved into an electrically closed position as the rotor is moved axially upward. The switch 226 further includes a set of contacts 228. Power is supplied to the switch 226 through a wire 230 and a reset signal is generated on wire 232 upon closure of the contacts 228. The means by which the rotor is caused to move axially upward and the purpose of the switch 226 will become apparent from the description below.

The operation of the EGR valve 10 is best understood in conjunction with the FIGS. 1, 3 and 4. With reference to FIG. 1 the EGR valve 10 is shown in a closed operating condition wherein exhaust gases are prohibited from entering the intake manifold. This closed condition is accomplished by communicating a series of control or step signals on line 232 received from an electronic control unit and then to the step motor control unit 42 and to the step motor 40 which causes the lead screw to rotate which in turn forces the nut 114 against the diaphragm 50 thereby urging the pintle valve 22 against its the valve seat 20. This closed operating condition of the EGR valve 10 is defined as the zero or reference position for future operation from which the position of the pintle valve 22, nut 112 or the rotation of the lead screw 110 can be measured.

The step motor control unit 42 consists of a number of stages which receive input signals and generates a series of sequenced signals to energize the motor windings. Such control mechanisms are well known in the art. As an example, the sequence logic 300 may accept step signals on line 302 and direction commands on line 304 and generate a sequence of drive signals. The step signals and direction commands may be generated by an electronic control unit, ECU, (not shown) in response to a plurality of engine parameters. The composition number of steps is scaled proportional to the desired EGR flow rate as established by the ECU. The drive signals are conditioned, amplified and scaled by a power drive circuit 306 which generates activation signals for the various motor windings 221. Current and voltage limiting 308 may be appropriate for motor protection.

The sequence logic 300 or the ECU may contain a counter 310 the contents of which contains a number indicative of composite number of step signals input to the step motor 40. Such number is directly correlatable to the axial position of the nut 112 relative to its zero or reference position.

The ECU may read this number for use in subsequent repositioning of the nut 112. However, during the prior operation of the EGR valve 10 there may have occurred a situation wherein the step motor 40 did not respond to a particular pulse or series of particular pulses and consequently the position of the lead screw 10 and nut 112 is different from the position or number stored in the counter 310 or in the ECU. This type of error is cummulative and will impair the performance of the valve 10 unless corrected. Correction of this condition is accomplished by the following:

When it is desired to terminate communication of exhaust gases the step motor 40 will be commanded, as discussed above thus causing the pintle valve 22 to be urged upon the valve seat 20. The step motor 20 will be commanded to continue to rotate its lead screw 110 thus urging the pintle valve 22 further onto the valve seat 20. This continued action will cause a reactive force to be imparted upwardly, as viewed in FIG. 1, thus causing the rotor 220 of the step motor to move upwardly relative to its bearings or bushings 222 thereby moving the switch 226 to change its electrical state, such as to close its cooperating contact 228. Alternatively, the contact 228 may be normally closed and the upward motion of the rotor 220 may open the contacts 228. When the contact 228 is closed a contact signal is generated and transmitted to the step motor control unit 42. The contact signal is used to notify the control unit that the pintle valve 22 has in fact closed off communication through the passage 16. In addition, this contact signal is utilized by the control unit 42 to thereafter zero appropriate storage registors or counters 310 contained therein to once again establish an electrical reference analogous to the closed or zero reference position of the pintle valve 22.

The signal generated by the contact 228 in addition to providing a zero reset signal as described above further provides a diagnostic feedback signal which may be used by the control unit 42 to indicate a malfunction within the EGR valve 10. This is accomplished as follows: If the step motor 40 is operating properly the pintle valve 22 will seat 20 upon the valve seat 22 in a time less than a preset maximum interval (or number of steps) which corresponds to the time needed to move the pintle valve from its fully opened to its fully closed position. Consequently, if the contact signal is not generated within this maximum time interval such condition will be an indication of a malfunction of the step motor 40 or other structure within the EGR valve 10. Consequently, a diagnostic signal may be generated by the control unit 42 or cooperating ECU, to the operator of the motor vehicle signifying such malfunction. Further, the advantage of periodically reseting the control unit 42 to zero upon closure of the pintle valve 22 upon its seat 20 results in the self compensation of the EGR valve 10 to dimensionality changes therein caused by wear of the various parts or by temperature fluctuations thereby permitting the accurate positioning of the pintle valve 22 under all operating conditions.

In the closed mode of operation the projection 126 of the nut 112 biases the valve 86 away from the opening 84. Consequently, air at atmospheric pressure is permitted to bleed into the upper housing member 34 through the openings 94, the opening 84 and through the space between the nut 112 and the diaphragm 50 as established by the lands or projections 100. This air bleed is useful to prevent vacuum from building up resulting in the pintle being lifted off its seat.

During the operation of the EGR valve 10 as previously mentioned a ported vacuum pressure is communicated to the vacuum port 36. It can be seen that a function of the step motor 40 is not perse to move the diaphragm but to act as a variable mechanical stop. It is, in fact, the imbalance of the pressure forces generated across the diaphragm 50 which actually moves the diaphragm 50 thus enabling the use of a low torque, rapidly responding, inexpensive step motor 40.

With reference again to FIG. 1 the EGR valve 10 is illustrated in its closed mode of operation wherein the nut 112 is biasing the pintle valve 22 against its valve seat 20. Upon generation of the contact signal such position corresponds to the newly reset zero position established within the control unit 42. If it is desired to now establish a predetermined flow of exhaust gases into the intake manifold the pintle valve 22 is moved from its valve seat by a predetermined amount. This is accomplished by transmitting a series of pulses from the control unit 42 to the step motor 40 which will thereafter rotate the lead screw 110 thus retracting the nut 112 to a new equilibrium position as illustrated in the partial view of FIG. 3.

Upon retraction of the nut 112 to the condition as illustrated in FIG. 3 the valve spring 92 will urge the valve 86 to close off communication through the opening 84 thus sealing the upper housing memeber 34. The sealing of the upper housing member 34 permits the build-up of vacuum pressure therein thus establishing a pressure imbalance across the diaphragm 50 which moves, the valve 86 carried by the diaphragm, the shaft 74 and pintle 22 in an upward direction thereby unseating the pintle valve from the seat 20 permitting a predetermined flow rate of exhaust gases to enter into the intake manifold.

The diaphragm 50 and the pintle valve 22 will continue its upward motion until the projection 126 of the nut 112 forces the valve 86 off from the plate 54 thus permitting atmospheric air to again flow into the upper housing member 34 as shown by the arrow 130 in FIG. 4. This action reduces the pressure differential across the diaphragm 50 and in conjunction with this reduced pressure differential permits the diaphragm spring 60 to move the diaphragm slightly downward. This action once again permits valve 86 to close off the opening 84 which permits the vacuum within the upper housing member 34 to increase thereby once again raising the diaphragm 50 and causing the valve 86 to contact the projection 126 which thereafter opens communication through opening 84 to reduce to level of vacuum within the upper housing member 34. In this manner the pintle valve 22 will be caused to oscillate about the reference position or stop established by the nut 112 and step motor 40.

When it is desired to move the pintle valve 22 to another reference position below that established in the example above to reduce the flow rate, control signals are again input to the step motor 40 which causes the nut 112 to be moved downward thus dislodging the valve 86 from the opening 84. The diaphragm 50 will be moved downwardly in response to the imbalanced pressure forces and the force of the diaphragm spring 60 in a manner similar to that discussed above. The shaft 74 and pintle valve 22 will be moved downward until the diaphragm 50 has moved sufficiently to permit the valve 86 to once again close off communication through the opening 84. Once this is established the diaphragm 50, shaft 74 and pintle valve 22 will oscillate about the new reference position established by the end of the nut 112.

Many changes and modifications in the above described embodiment of the invention can of course be carried out without departing from the scope thereof.

Accordingly, that scope is intended to be limited only by the scope of the appended claims.

I claim:

1. A variable flow rate valve comprising;

a housing defining a pressure chamber, a flexible diaphragm secured to said housing and defining an end of said pressure chamber, said diaphragm movable in one direction in response to decreases in the pressure within the pressure chamber and movable in an opposite direction in response to increases in the pressure within said pressure chamber;

means independent of said diaphragm for providing a variable mechanical position limit or stop for said diaphragm in said one direction including an axially extending member;

means for selectively varying the pressure within said pressure chamber for causing said diaphragm to move in response to the pressure differential thereacross for engagement with said stop means;

wherein said varying means comprises;

an opening through said diaphragm, valve means including a valve, positioned opposite said member proximate another side of said diaphragm for closing off communication through said opening, said valve means further including means for biasing said valve to close said opening wherein when said valve seals said opening pressure within said pressure chamber is permitted to decrease thereby moving said diaphragm in said one direction into engagement with said member and wherein when said valve is apart from said opening pressure within said chamber is permitted to increase moving said diaphragm in said opposite direction apart from said member, wherein said member includes a nut threadably and axially movable relative to a lead screw, said lead screw rotated by a step motor in response to control signals input thereto.

2. The valve as defined in claim 1 wherein said varying means includes means movable with said member and received through said opening for dislodging said valve from said opening.

3. The valve as defined in claim 2 wherein said dislodging means includes a projection extending from said member.

4. The valve as defined in claim 2 wherein said pressure chamber is a vacuum pressure chamber.

* * * * *